(12) United States Patent
Yamamoto

(10) Patent No.: US 8,514,429 B2
(45) Date of Patent: Aug. 20, 2013

(54) INFORMATION PROCESSING DEVICE

(75) Inventor: Hiroyuki Yamamoto, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 1253 days.

(21) Appl. No.: 11/962,825

(22) Filed: Dec. 21, 2007

(65) Prior Publication Data
US 2008/0158603 A1    Jul. 3, 2008

(30) Foreign Application Priority Data

Dec. 27, 2006  (JP) .................. 2006-351994

(51) Int. Cl.
*G06F 3/12* (2006.01)
*G06K 15/00* (2006.01)

(52) U.S. Cl.
USPC ........ 358/1.15; 358/1.13; 358/1.16; 358/1.17

(58) Field of Classification Search
USPC ............... 358/1.13–1.16, 403–406, 296, 305
See application file for complete search history.

(56) References Cited

U.S. PATENT DOCUMENTS

| | | | |
|---|---|---|---|
| 4,124,894 A | 11/1978 | Vick et al. | |
| 5,786,994 A | 7/1998 | Friz et al. | |
| 6,317,848 B1 * | 11/2001 | Sorens et al. | 714/48 |
| 7,269,763 B2 * | 9/2007 | Maehara | 714/48 |
| 2002/0008883 A1 | 1/2002 | Shibata | |
| 2003/0197889 A1 | 10/2003 | Tanimoto | |
| 2004/0125393 A1 | 7/2004 | Maehara | |
| 2005/0018242 A1 * | 1/2005 | Azami | 358/1.15 |
| 2005/0125695 A1 | 6/2005 | Gilbert et al. | |
| 2006/0078859 A1 | 4/2006 | Mullin | |
| 2006/0282419 A1 | 12/2006 | Sen et al. | |

FOREIGN PATENT DOCUMENTS

| | | |
|---|---|---|
| JP | 5-260279 A | 10/1993 |
| JP | 7-143319 A | 6/1995 |
| JP | 10-510061 T | 9/1998 |
| JP | 11-034441 | 2/1999 |
| JP | 2001-312394 A | 11/2001 |
| JP | 2003-319121 A | 11/2003 |
| JP | 2004-130790 A | 4/2004 |
| JP | 2005-001128 A | 1/2005 |
| WO | 96/16506 A1 | 5/1996 |

OTHER PUBLICATIONS

JP Office Action dtd May 19, 2009, JP Appln. 2006-351994.
JP Office Action dtd Oct. 21, 2008, JP Appln. 2006-351994.
Extended EP Search Report dtd Jun. 27, 2008, EP Appln. 07255035.3.
EP Office Action mailed Apr. 3, 2013, EP Appln. 07255035.3.

* cited by examiner

*Primary Examiner* — Satwant Singh
(74) *Attorney, Agent, or Firm* — Banner & Witcoff, Ltd.

(57) ABSTRACT

An information processing device may store and output information concerning events occurring in itself or another device. The information processing device may be provided with a destination-event type storing device, a first individual storing device, a first storage control device, and a first output control device. The destination-event type storing device may, for each of a plurality of destinations, store a combination of a destination and an event type. The first individual storing device may have a plurality of individual storing areas. Each individual storing area may correspond to a different destination. The first storage control device may, for each event that occurs, specify the destination combined with the event type from the destination-event type storing device, and store event occurrence information showing that the event type has occurred in the individual storage area corresponding to the specified destination. The first output control device may, for each individual storage area, output the event occurrence information stored in the individual storage area to the destination corresponding to the individual storage area.

15 Claims, 15 Drawing Sheets

FIG. 3

| Mode | Mail | FAX | List Printing |
|---|---|---|---|
| Service Mode | Address: service@example.com<br>Sending Time: Every 8 Hours | Number: 052-123-4567<br>Sending Time: 23:00 | Time: No Setting |
| User Mode | Address: user@example.com<br>Sending Time: 8:00 | Number: 052-234-5678<br>Sending Time: 20:00 on Friday | Time: 8:00 on Monday |

INFORMATION PROCESSING DEVICE

CROSS-REFERENCE TO RELATED APPLICATION

This application claims priority to Japanese Patent Application No. 2006-351994, filed on Dec. 27, 2006, the contents of which are hereby incorporated by reference into the present application.

BACKGROUND OF THE INVENTION

1. Field of the Invention

The present invention relates to an information processing device for storing and outputting information concerning events occurring in itself or another device.

2. Description of the Related Art

Various types of events occur in, for example, a printer. For example, events such as a paper jam, out of paper, out of toner, etc. may occur. In Japanese Patent Application Publication No. 11-34441, a printer is disclosed that stores and outputs the fact that an event has occurred. This printer stores a combination of a destination and an event type for a plurality of destinations. For example, a combination of a manager X1 and 'out of toner' is stored, and a combination of a user X2 and 'out of paper' is stored. Each time that an event occurs, this printer maps information showing that this type of event has occurred (below, this is termed event occurrence information) with a destination, and stores this in a list. For example, when the printer runs out of toner, event occurrence information showing 'out of toner' and the manager X1 are mapped and are stored in the aforementioned list. Further, when the printer runs out of paper, event occurrence information showing 'out of paper' and the user X2 are mapped and are stored in the aforementioned list. The printer periodically outputs the stored contents of the list. In this output process, the event occurrence information being stored in the list is output to the destinations with which it is mapped. In the above example, the event occurrence information showing 'out of toner' is output to a mail address of the manager X1, and the event occurrence information showing 'out of paper' is output to a mail address of the user X2.

BRIEF SUMMARY OF THE INVENTION

In the printer of the Japanese Patent Application Publication No. 11-34441, event occurrence information for each event that has occurred in the printer is accumulated and stored in one list. The capacity of the list is limited, and the number of items of event occurrence information that can be stored in the list is limited. For example, a list may be capable of storing four items of event occurrence information. In this case, if 'out of toner' occurs once and then 'out of paper' occurs four times after this within a period from the stored contents of the list being output to the next time this content is output, the event occurrence information showing 'out of toner' may be erased from the list. In this case, the four items of event occurrence information showing 'out of paper' will be output to the user X2, but the event occurrence information showing 'out of toner' will not be output to the manager X1. The user X2 is thus able to receive plenty of information, whereas the manager X1 is completely unable to receive information. For example, in the case where the manager X1 is a manager who performs maintenance and the like, there is the problem that error information that the manager X1 should be informed of is not being output, and consequently required maintenance may not be performed on the printer.

An improved information processing device for storing and outputting event occurrence information is required.

An information processing device disclosed in the present specification may store and output information concerning events occurring in itself or another device. The term 'event' is used in its broadest interpretation, and can include all phenomena occurring within the information processing device or in another device. For example, 'events' can be not only phenomena that prevent the information processing device or another device from realizing its functions (e.g. a paper jam, out of toner, communication error, etc.), but also phenomena in which the information processing device or another device realizes its functions (e.g. printing function, FAX transmission function, etc.). The information processing device may be provided with a destination-event type storing device, a first individual storing device, a first storage control device, and a first output control device.

The destination-event type storing device may store a combination of a destination and an event type for each of a plurality of destinations. For example, a combination of a destination Y1 and an event type Z1 is stored, and a destination Y2 and an event type Z2 is stored. Furthermore, a plurality of event types may be combined with one destination. For example, the event type Z1 and an event type Z3 may be combined with the destination Y1. Further, a plurality of destinations may be combined with one event type. For example, an event type Z4 may be combined with both the destination Y1 and the destination Y2. The first individual storing device may have a plurality of individual storing areas. Each individual storing area may correspond to a different destination. For example, in the above example, the first individual storing device may have an individual storage area corresponding to the destination Y1 and an individual storage area corresponding to the destination Y2. For each event that occurs, the first storage control device may specify the destination combined with the event type from the destination-event type storing device, and store event occurrence information showing that the event type has occurred in the individual storage area corresponding to the specified destination. For example, in the above example, when the event type Z1 has occurred, the first storage control device may store the type Z1 event occurrence information in the individual storage area corresponding to the destination Y1. Further, when the event type Z2 has occurred, the first storage control device may store the type Z2 event occurrence information in the individual storage area corresponding to the destination Y2. For each individual storage area, the first output control device may output the event occurrence information stored in the individual storage area to the destination corresponding to the individual storage area. For example, in a case where the type Z1 event occurrence information is being stored in the individual storage area corresponding to the destination Y1, the first output control device may output the type Z1 event occurrence information to the destination Y1. Further, in a case where for example the type Z2 event occurrence information is being stored in the individual storage area corresponding to the destination Y2, the first output control device may output the type Z2 event occurrence information to the destination Y2. Moreover, the first output control device may equally well output the event occurrence information being stored in the individual storage areas with simultaneous timing or with differing timing.

The above information processing device may be provided with an individual storage area for each destination. If this is done, the stored contents of each individual storage area are not affected by the event occurrence information that should be stored in another individual storage area. For example, in the case of the above example, even if the event type Z1 to be output to the destination Y1 has occurred, the stored contents of the individual storage area corresponding to the destination Y2 are not affected. With this information processing device, it is possible to provide the event occurrence information to every destination without being affected by the amount of information to be output to another destination.

One technique disclosed in the present specification is the following information processing device. This information processing device may be provided with an output format-event type storing device, a second individual storing device, a second storage control device, and a second output control device.

The output format-event type storing device may store a combination of an output format and an event type for each of a plurality of output formats. The term 'plurality of output formats' of the present specification may be construed that the specific output means for outputting event occurrence information are different. For example, outputting by means of 'printing' and outputting by means of 'mail transmission' are different output means. In this case, both the output format of 'printing' and the output format of 'mail transmission' may be present. In the case of this example, the output format-event type storing device may store a combination of an event type (for example Z1) and the output format of 'printing', and a combination of an event type (for example Z2) and the output format of 'mail transmission'. The second individual storing device may have a plurality of individual storing areas. Each individual storing area may correspond to a different output format. For each event that occurs, the second storage control device may specify the output format combined with the event type from the output format-event type storing device, and store event occurrence information showing that the event type has occurred in the individual storage area corresponding to the specified output format. For each individual storage area, the second output control device may output the event occurrence information stored in the individual storage area by using the output format corresponding to the individual storage area.

The above information processing device may be provided with an individual storage area for each output format. If this is done, the stored contents of the individual storage areas for each output format are not affected by the event occurrence information that should be stored in other individual storage areas. With this information processing device, the event occurrence information can be output in accordance with each output format without this being affected by the amount of information that should be output using other output formats. Further, in a case where the recipient (i.e. the destination) has been allocated for each output format, the event occurrence information can be output in accordance with each destination without being affected by the amount of information that should be output to other destinations.

BRIEF DESCRIPTION OF THE DRAWINGS

FIG. 3 shows an example of destination information.

DETAILED DESCRIPTION OF THE PREFERRED EMBODIMENT

First Embodiment

Figure 1:
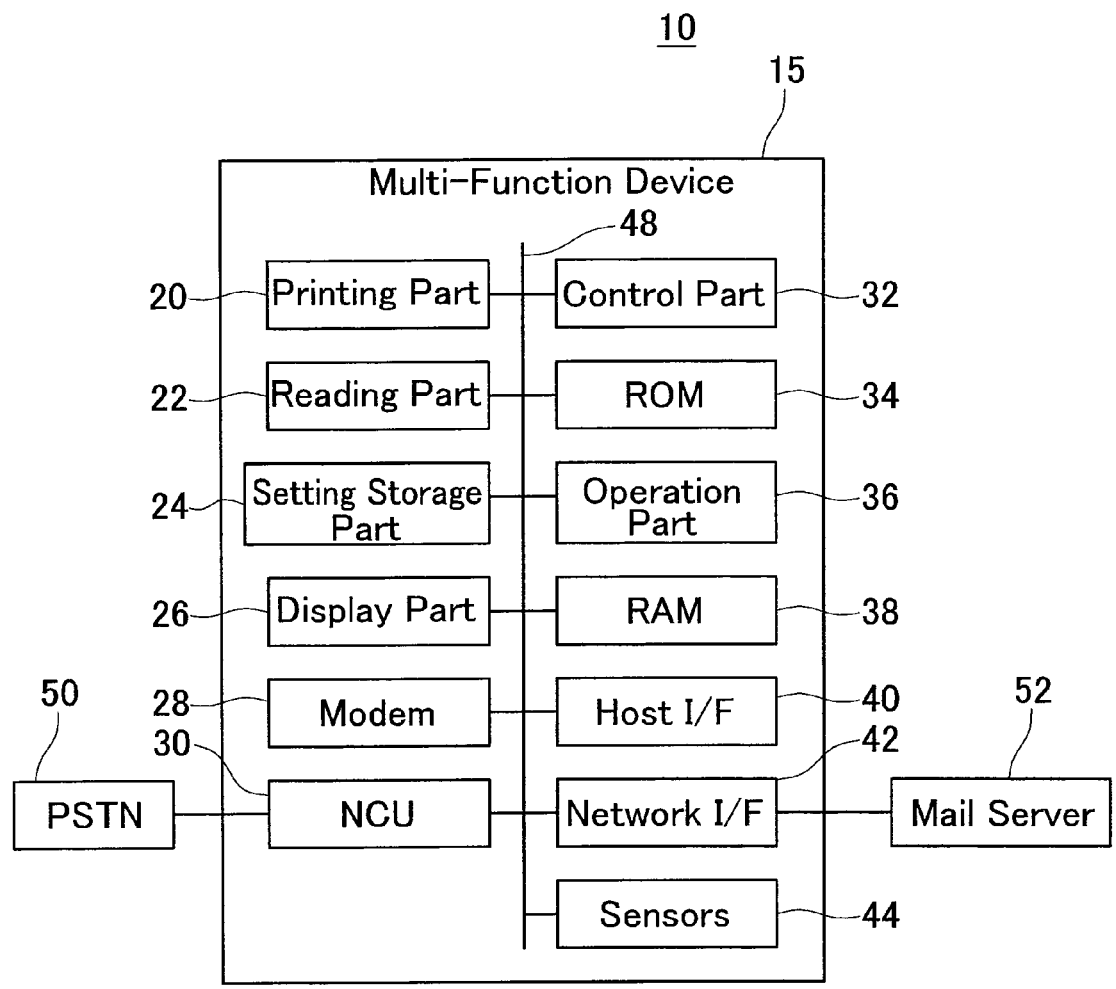
FIG. 1 shows a schematic view of a multi-function device system.

A first embodiment will be described with reference to figures. FIG. 1 shows a multi-function device system 10 of the present embodiment. The multi-function device system 10 comprises a multi-function device 15, a PSTN (Public Switched Telephone Network) 50, and a mail server 52, etc.

(Configuration of the Multi-Function Device)

The multi-function device 15 comprises a printing part 20, a reading part 22, a setting storage part 24, a display part 26, a modem 28, an NCU (Network Control Unit) 30, a control part 32, a ROM 34, an operation part 36, a RAM 38, a host I/F 40, a network I/F 42, various types of sensors 44, etc. The devices 20, 22, 24, etc. are mutually connected in a manner capable of communication by a bus 48. The printing part 20 is capable of performing printing on a printing medium. The reading part 22 is capable of scanning documents and forming image data. The setting storage part 24 is capable of storing setting information. The setting storage part 24 of the present embodiment stores archive information and destination information. This information will be described below.

Figure 2:
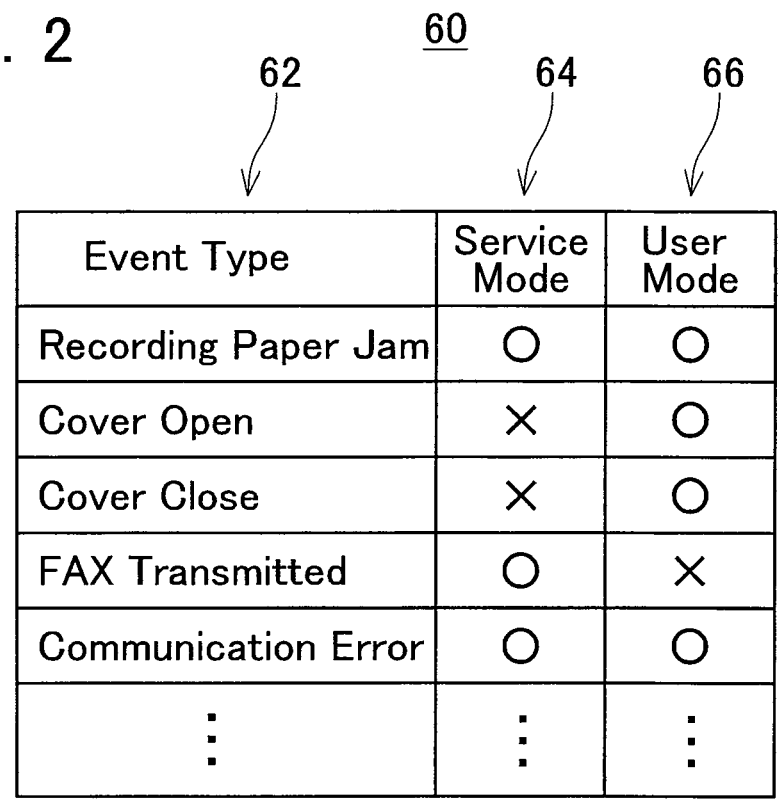
FIG. 2 shows an example of archive information.

FIG. 2 shows an example of archive information 60 stored by the setting storage part 24. The archive information 60 comprises event type specifying information 62. Events are phenomena occurring in the multi-function device 15. The following are shown in FIG. 2 as examples of events: recording paper jam, cover open, cover closed, FAX transmitted, and communication error. 'Recording paper jam' means that a paper jam has occurred in the multi-function device 15. The multi-function device 15 comprises a main body in which the printing part 20, etc. are housed, and a cover attached to the main body in a manner allowing opening and closing (neither are shown). When the cover is opened, the interior of the multi-function device 15 can be seen, and maintenance can be performed on the devices. 'Cover open' in FIG. 2 means that the cover is open. Further, 'Cover closed' means that the cover is closed. 'FAX transmitted' means that a facsimile has been transmitted. 'Communication error' means that FAX transmission could not be performed.

The archive information 60 has information 64 and 66 that shows whether the event type specifying information 62 corresponds to either the service mode or the user mode, or to both. A mark showing a circle in FIG. 2 means that the event type specifying information 62 and the relevant mode have been mapped. A mark showing a cross in FIG. 2 means that the event type specifying information 62 and the relevant mode have not been mapped. For example, in 'Recording paper jam', the event type specifying information 62 is mapped to both the service mode and the user mode. Further, in for example 'Cover open', the event type specifying information 62 is not mapped to the service mode, and is mapped only to the user mode. In the case of event types mapped to the service mode, this information showing that this event has occurred (below, this is termed event occurrence information) is required by a serviceman. The serviceman is someone who performs maintenance on the multi-function device 15. In the example in FIG. 2, 'Recording paper jam', 'FAX transmitted', and 'Communication error' are mapped to the service mode, and this means that this event occurrence information is required by the serviceman. Further, in the case of event types mapped to the user mode, this type of event occurrence information is required by the user of the multi-function device 15. In the example in FIG. 2, 'Recording paper jam', 'Cover open', 'Cover closed', and 'Communication error' are mapped to the user mode, and this means that this event occurrence information requires the user.

FIG. 3 shows an example of destination information 70 stored in the setting storage part 24 (see FIG. 1). The destination information 70 maps and stores mode specifying information 72, mail relating information 73, FAX relating information 74, and list printing relating information 76. The mode specifying information 72 is information that specifies either the user mode or the service mode. The mail relating information 73 includes a mail address 78 and a mail sending (transmission) time 80. The FAX relating information 74 includes a FAX number 82 and a FAX sending (transmission) time 84. The list printing relating information 76 includes a list output time 86. In the example in FIG. 3, the following are mapped to the service mode: the mail address 78, the mail transmission time 80, the FAX number 82, the FAX transmission time 84, and the list output time 86. The mail address 78 and the FAX number 82 mapped to the service mode are the mail address and the FAX number of the serviceman. Further, although reference numbers are omitted in FIG. 3, the following are also mapped to the user mode: a mail address, a mail transmission time, a FAX number, a FAX transmission time, and a list output time. The mail address and the FAX number mapped to the user mode are the mail address and the FAX number of the user. The setting storage part 24 (see FIG. 1) is capable of storing the mail transmission time, the FAX transmission time, and the list output time in various formats. For example, in the example in FIG. 3, the mail transmission time 80 is stored as 'Every 8 hours'. In this case, the setting storage part 24 can store a first time (for example, 10 a.m.) at which the mail transmission time 80 was set, a second time (for example, 6 p.m.) that is eight hours after the first time, and a third time (for example, 2 a.m.) that is eight hours after the second time. Further, in the example in FIG. 3, the FAX transmission time 84 is stored as 'Daily at 11 p.m.', and the list output time 86 is stored as 'No setting'. 'No setting' means that a time for the list output time is not being stored.

As described above, the event specifying information 62 and the mode (service mode and/or user mode) are mapped in the archive information 60. Further, the mode specifying information 72, mail address 78, mail transmission time 80, FAX number 82, FAX transmission time 84, and list output time 86 are mapped in the destination information 70. It could thus be considered that the event specifying information 62, mail address 78, mail transmission time 80, FAX number 82, FAX transmission time 84, and list output time 86 are combined from the following two items of information: the archive information 60 and the destination information 70.

The manner of utilizing the information stored in the archive information 60 and the destination information 70 will be described in detail later.

The display part 26 shown in FIG. 1 is capable of displaying information. The modem 28 converts data between digital data and audio signals. The NCU 30 is connected with the PSTN 50. The NCU 30 functions to transmit or receive data via the PSTN 50. The control part 32 has a CPU or the like. The control part 32 exerts general control over the devices 20, 22, 26, etc. mounted in the multi-function device 15 in accordance with programs stored in the ROM 34 (to be described). The ROM 34 stores various programs. The operation part 36 has a plurality of keys operated by the user. The user can input commands to the multi-function device 15 by operating the operation part 36. The user can input the archive information 60 (see FIG. 2) and the destination information 70 (see FIG. 3) to the multi-function device 15 by operating the operation part 36. The setting storage part 24 stores the archive information 60 and destination information 70 input by the user. Further, the user can change the stored contents of the archive information 60 by operating the operation part 36. For example, 'Recording paper jam' is mapped to both the service mode and the user mode in the example in FIG. 2. However, the stored contents can be changed so that 'Recording paper jam' is mapped only to the service mode. Further, the user can change the stored contents of the destination information 70 by operating the operation part 36. For example, the mail address 78 and the mail transmission time 80 can be changed.

Figure 4:
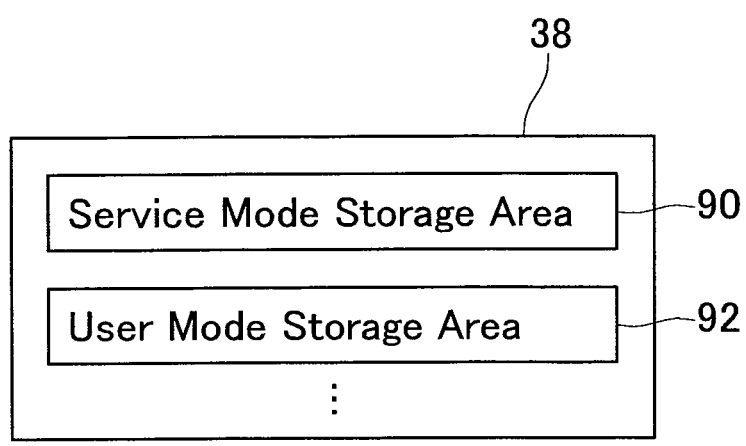
FIG. 4 shows a configuration of a RAM.

The RAM 38 shown in FIG. 1 is capable of temporarily storing information. As shown in FIG. 4, the RAM 38 of the present embodiment has a service mode storage area 90 and a user mode storage area 92. The type of information stored in these storage areas 90 and 92 will be described in detail later. Various devices can be connected with the host I/F 40 shown in FIG. 1. For example, a digital camera or the like can be connected with the host I/F 40. The network I/F 42 is connected with the internet. The multi-function device 15 can communicate with devices on the internet via the network I/F 42. In the present embodiment, the multi-function device 15 is connected with the mail server 52 on the internet. The sensors 44 detect the types of events that have occurred in the multi-function device 15. For example, the sensors 44 comprise a sensor for detecting the recording paper jam, a sensor for detecting the cover being open (the cover being closed), etc. The configuration of these sensors is generally known, and consequently is not described in detail in the present embodiment.

(Contents of Normal Process)

Figure 5:
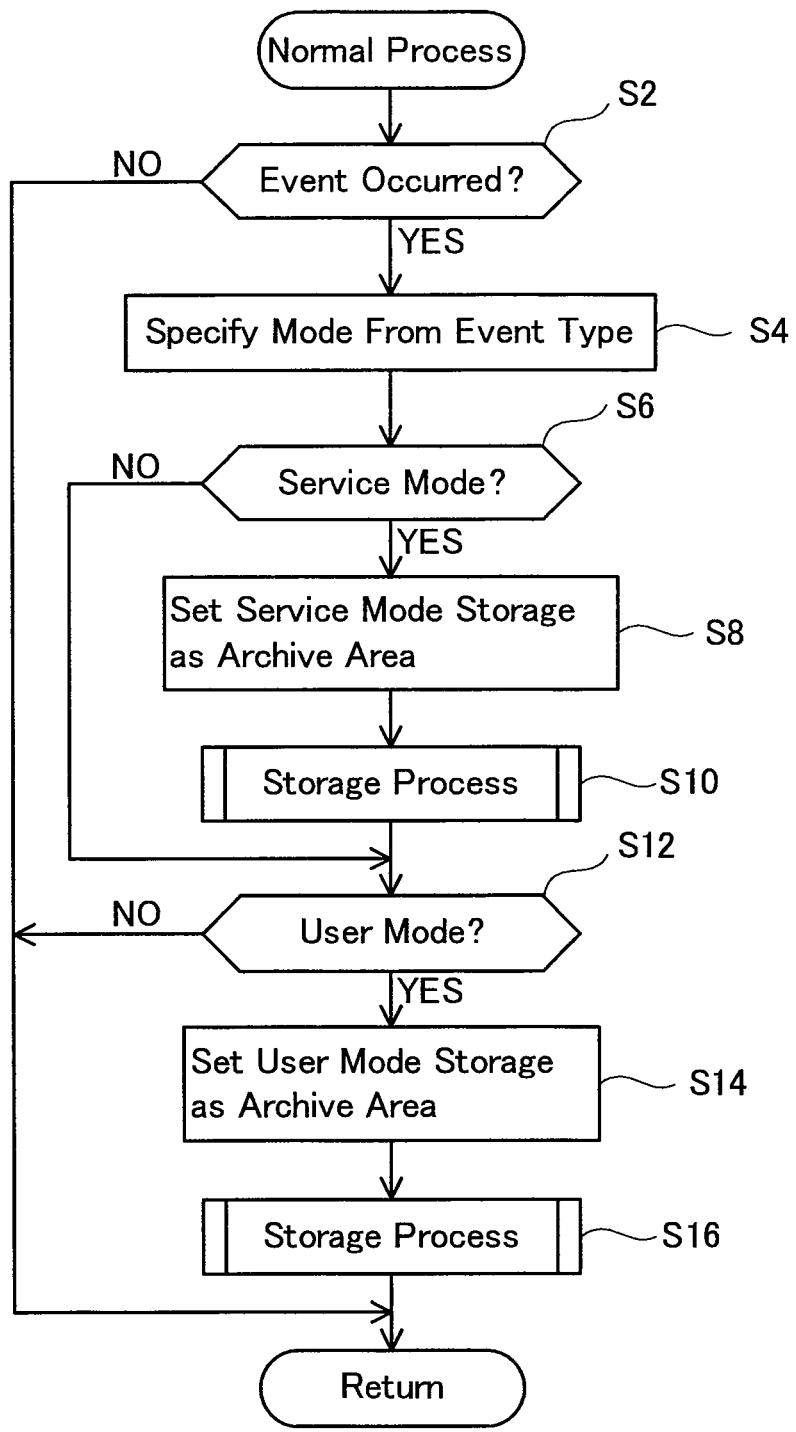
FIG. 5 shows a flow chart of a normal process executed by a multi-function device.

The contents of the process executed by the control part 32 of the multi-function device 15 will be described next. The control part 32 repeatedly executes the normal process described below while a power source of the multi-function device 15 is ON. FIG. 5 shows a flow chart of the normal process. The control part 32 monitors whether an event has occurred in the multi-function device 15 (S2). In the case where any of the plurality of events given as an example in FIG. 2 have occurred, YES is determined in S2. The control part 32 recognizes that 'Recording paper jam', 'Cover open', or 'Cover closed' has occurred based on signals output from the sensors 44. Further, the control part 32 recognizes that 'FAX transmitted' has occurred in the case where a FAX transmission has been satisfactorily executed following a command of the user. Conversely, the control part 32 recognizes that a 'Communication error' has occurred in the case where a FAX transmission has not been satisfactorily executed.

In the case where S2 is YES, the control part 32 specifies the mode mapped with the event type that occurred by retrieving the archive information 60 (see FIG. 2) using the event type as a key (S4). In the case where 'Recording paper jam' has occurred, for example, the control part 32 specifies both the service mode and the user mode. Further, in the case for example where 'Cover open' has occurred, the control part 32 only specifies the user mode. Next, the control part 32 determines whether the mode specified in S4 is the service mode (S6). In the case where S6 is YES, the process proceeds to S8. In the case where S6 is NO, S8 and S10 are skipped, and the process proceeds to S12. In S8, the service mode storage area 90 (see FIG. 4) is set as an archive area. Next, the control part 32 executes a storage process (S10). The contents of this storage process will be described later. When S10 has been completed, the process proceeds to S12.

In S12, the control part 32 determines whether the mode specified in S4 is the user mode. In the case where S12 is YES, the process proceeds to S14. In the case where S12 is NO, S14 and S16 are skipped, and the process returns to S2. In S14, the user mode storage area 92 (see FIG. 4) is set as an archive area. Next, the control part 32 executes a storage process (S16). This storage process is substantially the same as the storage process of S10. The contents of the storage processes of S10 and S16 will be described next.

(Contents of Storage Process)

Figure 6:
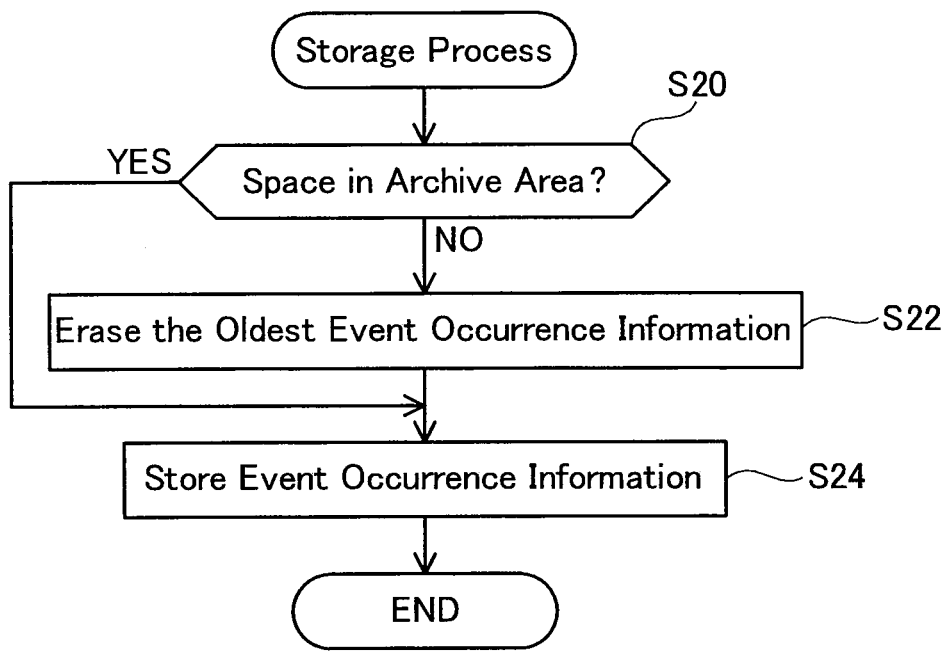
FIG. 6 shows a flow chart of a storage process executed by the multi-function device.
Figure 7:
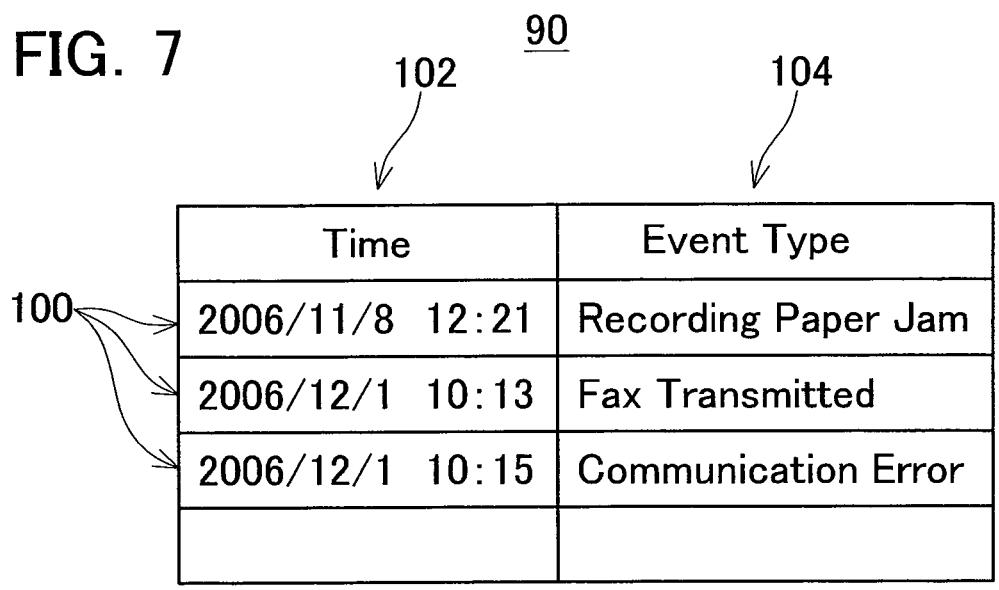
FIG. 7 shows an example of stored contents of a service mode storage area.

FIG. 6 shows a flow chart of the storage process. First, the control part 32 determines whether there is space in the archive area (S20). This archive area is either the service mode storage area 90 set in S8 in the case where the storage process of S10 is being executed, or the user mode storage area 92 set in S14 in the case where the storage process of S16 is being executed. FIG. 7 shows an example of the stored contents of the service mode storage area 90. In the example of FIG. 7, three items of event occurrence information 100 are being stored in the service mode storage area 90 due to past storage processes (the storage processes of S110 in FIG. 5). An upper limit is determined of the number of items of event occurrence information 100 that the service mode storage area 90 is capable of storing. In the present embodiment, the service mode storage area 90 is capable of storing four items of event occurrence information 100. That is, there are four storage areas each capable of storing one item of event occurrence information 100 in the service mode storage area 90 of the present embodiment. In the example of FIG. 7, the service mode storage area 90 is storing only three items of event occurrence information 100. The service mode storage area 90 is capable of storing one more item of event occurrence information 100. In this case, the control part 32 determines that S20 is YES.

Figure 8:
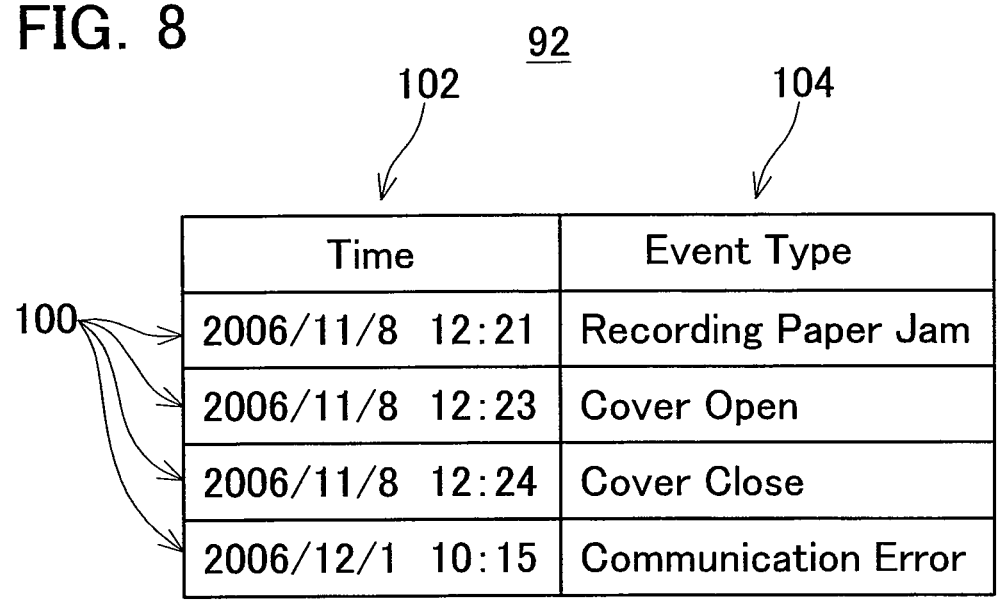
FIG. 8 shows an example of stored contents of a user mode storage area.

FIG. 8 shows an example of the stored contents of the user mode storage area 92. In the example of FIG. 8, four items of event occurrence information 100 are being stored in the user mode storage area 92 due to past storage processes (the storage processes of S16 in FIG. 5). The user mode storage area 92 of the present embodiment is also capable of storing four items of event occurrence information 100. That is, there are four storage areas each capable of storing one item of event occurrence information 100 in the user mode storage area 92 of the present embodiment. In the example of FIG. 8, the user mode storage area 92 is storing four items of event occurrence information 100, i.e. it is storing its upper limit. In this case, the control part 32 determines that NO in S20.

In the case of NO in S20, the control part 32 erases the oldest item of event occurrence information 100 (S22). For example, in the example in FIG. 8, the following item of event occurrence information 100 is erased: 12.21, Nov. 8, 2006. In this case, the remaining three items of event occurrence information 100 are each moved one storage area ahead. As a result, an empty storage area is formed following the newest item of event occurrence information 100 (10.15 a.m., Dec. 1, 2006). Next, the control part 32 stores the event occurrence information 100 in the archive area (S24). As shown in FIGS. 7 and 8, the event occurrence information 100 includes data 102 showing the time the event occurred, and data 104 showing specifying the event type. For example, in the case of the example in FIG. 7, the control part 32 stores the data 102 showing the current time (i.e. the time that the event occurred) and the data 104 specifying the event type that occurred at S2 in the storage area following the storage area storing the newest item of event occurrence information 100 (10.15 a.m., Dec. 1, 2006). Further, in the case of the example in FIG. 8, an empty storage area was formed in S22 by erasing the oldest item of event occurrence information 100. The control part 32 stores the data 102 showing the current time and the data 104 specifying the event type that occurred at S2 in the empty storage area described above.

As was described with reference to FIGS. 5 and 6, the multi-function device 15 of the present embodiment stores the event occurrence information 100 in the RAM 38 each time an event occurs. In accordance with the event type, the event occurrence information 100 is stored in the service mode storage area 90 and/or the user mode storage area 92. The control part 32 outputs the event occurrence information 100 being stored in the storage areas 90 and 92 to the exterior (mail transmission, FAX transmission, or printing) by executing an output monitoring process (described next).

(Contents of Output Monitoring Process)

Figure 9:
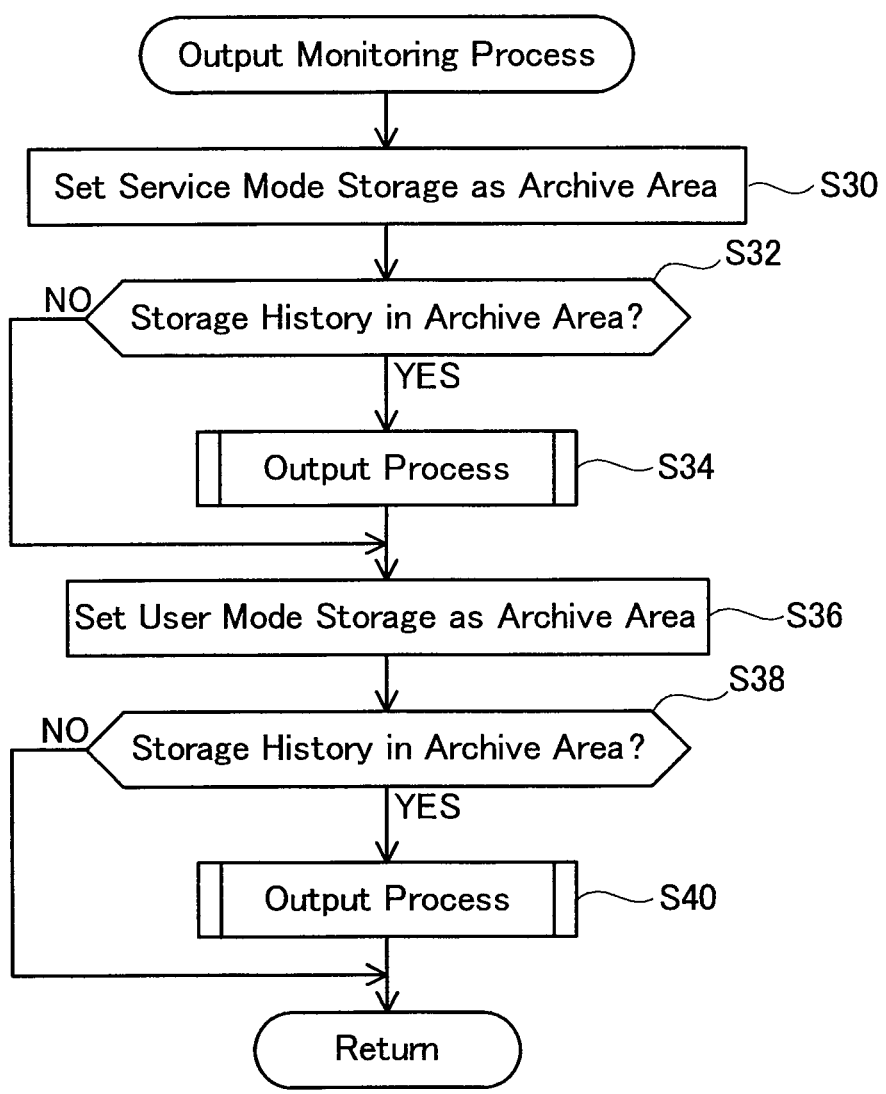
FIG. 9 shows a flow chart of an output monitoring process executed by the multi-function device.

The control part 32 repeatedly executes at frequent intervals (for example, once per minute) the output monitoring process described below while the power source of the multi-function device 15 is ON. FIG. 9 shows a flow chart of the output monitoring process. First, the control part 32 sets the service mode storage area 90 as the archive area (S30), and then determines whether at least one item of event occurrence information 100 is being stored in the archive area (the service mode storage area 90) (S32). In the case where S32 is YES, the process proceeds to S34. In the case where S32 is NO, S34 is skipped, and the process proceeds to S36. In S34, the control part 32 executes an output process. The contents of the output process will be described in detail later. When S34 ends, the process proceeds to S36. In S36, the control part 32 sets the user mode storage area 92 as the archive area, and then determines whether at least one item of event occurrence information 100 is being stored in the archive area (the user mode storage area 92) (S38). In the case where S38 is YES, the process proceeds to S40. In the case where S38 is NO, S40 is skipped, and the process returns to S30. In S40, the control part 32 executes an output process. This output process is substantially the same as the output process of S34. The contents of the output processes of S34 and S40 will be described next.

(Contents of the Output Process)

Figure 10:
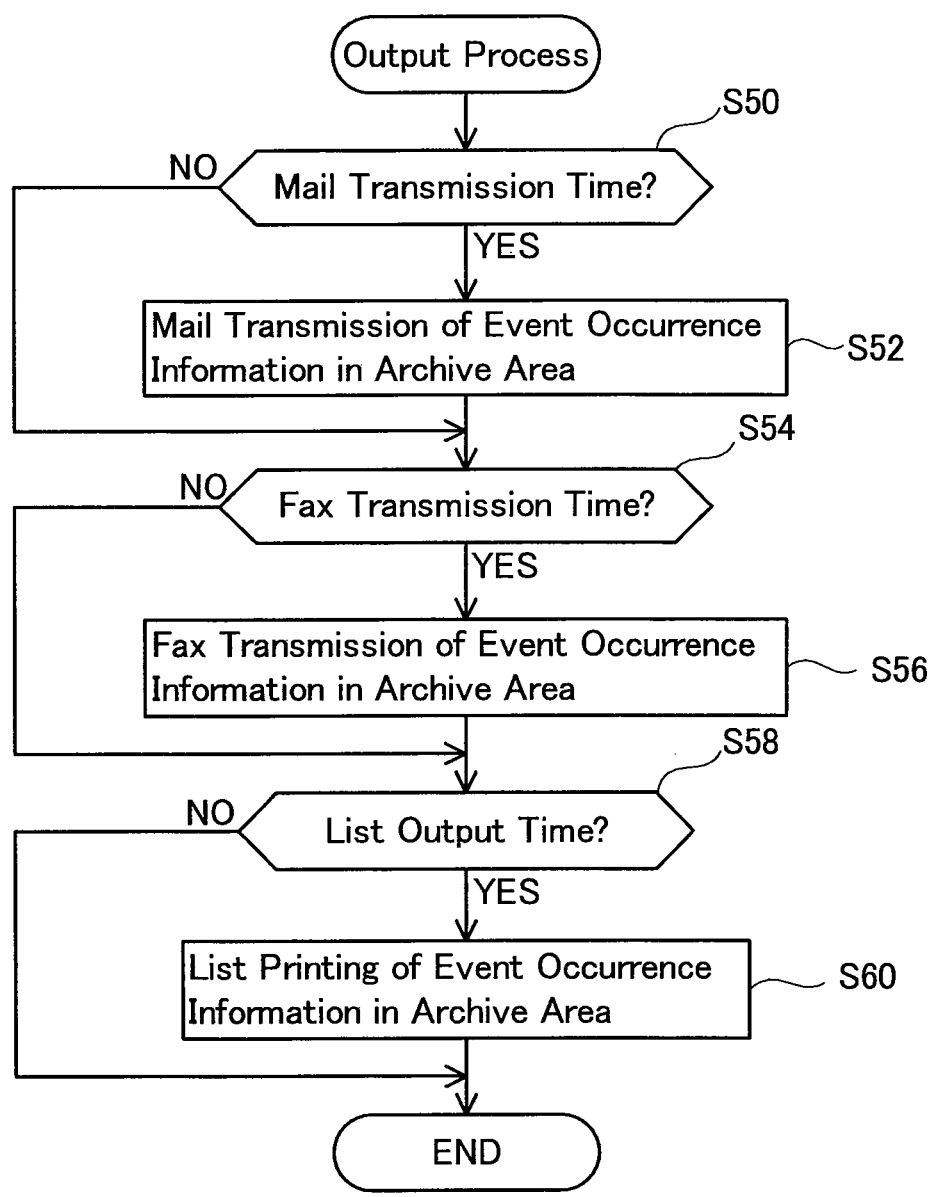
FIG. 10 shows a flow chart of an output process executed by the multi-function device.

FIG. 10 shows a flow chart of the output process. First, the control part 32 specifies the mail transmission time from the setting storage part 24 (see FIG. 1). For example, in the case where this output process is the output process of S34 of FIG. 9, the control part 32 specifies the mail transmission time 80 that is mapped with the service mode in the destination information 70. Since the mail transmission time 80 is 'Every 8 hours' in the case of the present embodiment, three times are specified (for example, 10 a.m., 6 p.m., and 2 a.m.) Further, in the case for example where this output process is the output process of S40 of FIG. 9, the control part 32 specifies the mail transmission time (8 a.m.) that is mapped with the user mode in the destination information 70. The control part 32 compares the specified mail transmission time with the current time (S50). In the case where the current time and the specified mail transmission time are the same, the control part 32 determines YES in S50. In the case where S50 is YES, the process proceeds to S52. In the case where S50 is NO, S52 is skipped and the process proceeds to S54.

In S52, the control part 32 performs mail transmission of the event occurrence information 100 that is being stored in the archive area. For example, in the case where this output process is the output process of S34 of FIG. 9, all of the event occurrence information 100 (see FIG. 7) being stored in the service mode storage area 90 is transmitted as mail to the mail address 'service@example.com' (see FIG. 3). Further, in the case for example where this output process is the output process of S40 of FIG. 9, all of the event occurrence information 100 (see FIG. 8) being stored in the user mode storage area 92 is transmitted as mail to the mail address 'user@example.com' (see FIG. 3). The mail is sent to the mail server 52 via the network I/F 42.

Figure 11:
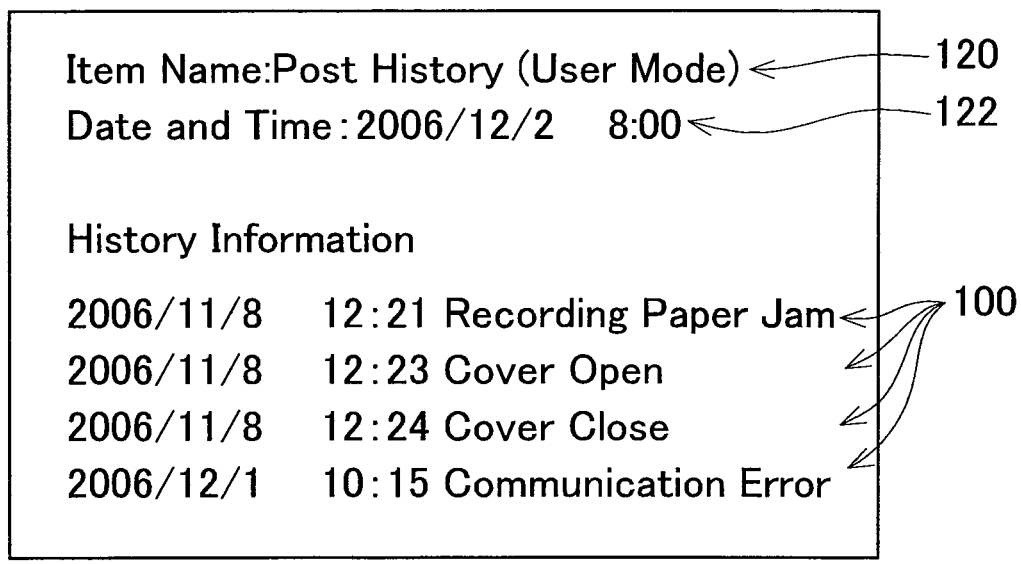
FIG. 11 shows an output example of event occurrence information.

FIG. 11 shows an example of data transmitted as mail in S52. This data includes data 120 showing item name, data 122 showing mail transmission time, and the event occurrence information 100. The data 120 includes data showing service mode or user mode. The data 122 is the time when the mail was sent in S52. The event occurrence information 100 includes data showing the time the event occurred and the event type.

In S54 of FIG. 10, the control part 32 specifies the FAX transmission time from the setting storage part 24. For example, in the case where this output process is the output process of S34 of FIG. 9, the control part 32 specifies that '11 p.m.' is mapped with the service mode in the destination information 70 (see FIG. 3). Further, in the case for example where this output process is the output process of S40 of FIG. 9, the control part 32 specifies that 'Friday, 8 p.m.' is mapped with the user mode in the destination information 70 (see FIG. 3). The control part 32 compares the specified FAX transmission time with the current time. In the case where the current time and the specified FAX transmission time are the same, the control part 32 determines YES in S54. In the case where S54 is YES, the process proceeds to S56. In the case where S54 is NO, S56 is skipped and the process proceeds to S58.

In S56, the control part 32 performs FAX transmission of the event occurrence information 100 that is being stored in the archive area. For example, in the case where this output process is the output process of S34 of FIG. 9, all of the event occurrence information 100 being stored in the service mode storage area 90 is transmitted as a FAX to the FAX number '052-123-4567' (see FIG. 3). Further, in the case for example where this output process is the output process of S40 of FIG. 9, all of the event occurrence information 100 being stored in the user mode storage area 92 is transmitted as a FAX to the FAX number '052-234-5678' (see FIG. 3). The FAX is sent by the function of the modem 28 and the NCU 30. The FAX is sent via the PSTN 50.

In S58, the control part 32 specifies the list output time from the setting storage part 24. For example, in the case where this output process is the output process of S34 of FIG. 9, the control part 32 specifies that 'No setting' is mapped with the service mode in the destination information 70 (see FIG. 3). In this case, the control part 32 determines NO in S58. Further, in the case for example where this output process is the output process of S40 of FIG. 9, the control part 32 specifies that 'Monday, 8 a.m.' is mapped with the user mode in the destination information 70 (see FIG. 3). The control part 32 compares the specified list output time with the current time. In the case where the current time and the list output time are the same, the control part 32 determines YES in S58. In the case where S58 is YES, the process proceeds to S60. In the case where S58 is NO, S60 is skipped and the output process ends.

In S60, the control part 32 executes a process to print the event occurrence information 100 that is being stored in the archive area. For example, in the case where this output process is the output process of S34 of FIG. 9, NO was determined in S58, and consequently the process of S60 is not executed. In the case where this output process is the output process of S40 of FIG. 9, all of the event occurrence information 100 being stored in the user mode storage area 92 is caused to be printed by the printing part 20 (see FIG. 1). As a result, the printing part 20 prints the event occurrence information 100 being stored in the user mode storage area 92 onto a print medium.

In the multi-function device 15 in the embodiment described above, the service mode storage area 90 and the user mode storage area 92 are provided in the RAM 38. The event occurrence information 100 that the serviceman should be informed of is stored in the service mode storage area 90. The event occurrence information 100 stored in the service mode storage area 90 is output to the mail address 78 and FAX number 82 of the serviceman. The serviceman can thus be informed of the event occurrence information he should know about. The event occurrence information 100 that the user should be informed of is stored in the user mode storage area 92. The event occurrence information 100 stored in the user mode storage area 92 is output to the mail address and FAX number of the user. The user can thus be informed of the event occurrence information she or he should know about. The stored contents of the service mode storage area 90 are not affected by the event occurrence information 100 that the user should be informed of (for example, cover open, cover closed). Further, the stored contents of the user mode storage area 92 are not affected by the event occurrence information 100 that the serviceman should be informed of (for example, FAX transmitted). With the multi-function device 15 of the present embodiment, the event occurrence information 100 can be provide to both the serviceman and the user without being affected by the amount of information that should be output to another destination.

Furthermore, in the present embodiment, mail transmission and FAX transmission can be performed of the event occurrence information 100 being stored in the service mode storage area 90, but printing thereof cannot be performed. This is because the list output time of the service mode is 'No setting' in the destination information 70 (see FIG. 3). By contrast, mail transmission, FAX transmission, and printing can be performed of the event occurrence information 100 being stored in the user mode storage area 92. The service mode and user mode could thus be said to differ in their output format for outputting the event occurrence information. As described above, the archive information 60 of the present embodiment (see FIG. 2) stores a combination of the event specifying information 62 and the mode. Further, the destination information 70 (see FIG. 3) stores a combination of the mode and the output format (mail transmission, FAX transmission, printing). The event specifying information 62 and the output format can thus be said to be mapped (combined) from the following two items of information: the archive information 60 and the destination information 70. In the multi-function device 15 of the present embodiment, the output format of the event occurrence information 100 that is being stored in the service mode storage area 90 (i.e. mail transmission and FAX transmission; hereafter referred to as service mode output format), and the output format of the event occurrence information 100 that is being stored in the user mode storage area 92 (i.e. mail transmission, FAX transmission, and printing; hereafter referred to as user mode output format), are different. The stored contents of the service mode storage area 90 are not affected by the event occurrence information 100 that should be output by the user mode output format (for example, cover open, cover closed). Further, the stored contents of the user mode storage area 92 are not affected by the event occurrence information 100 that should be output by the service mode output format (for example, FAX transmission). With the multi-function device 15 of the present embodiment, the event occurrence information 100 can be output using each output format without being affected by the amount of information that should be output using another output format.

In the present embodiment, the storage areas 90 and 92 store only the event occurrence information 100, and do not store the destinations (mail address and FAX number) that are mapped to the event occurrence information 100. The storage areas 90 and 92 are also capable of adopting a technique of mapping and storing the event occurrence information 100 and the destinations. In this case, however, the amount of information that the storage areas 90 and 92 must store would be greater than in the case where only the event occurrence information 100 is stored. In the present embodiment, because the service mode storage area 90 and the user mode storage area 92 are provided separately, it is not necessary to map the destinations to the event occurrence information 100 and to store this combination. As a result, the amount of information to be stored in the storage areas 90 and 92 can be compressed.

Second Embodiment

In the multi-function device 15 of the first embodiment, the storage capacity of the service mode storage area 90 and the user mode storage area 92 is fixed. That is, the storage areas 90 and 92 have the same capacity, and can store a maximum of four items of event occurrence information 100. In the present embodiment, the capacity of the storage areas 90 and 92 can be changed. This capacity changing process is performed by the control part 32 (see FIG. 1).

Capacity Changing Process

Second Embodiment

Figure 12:
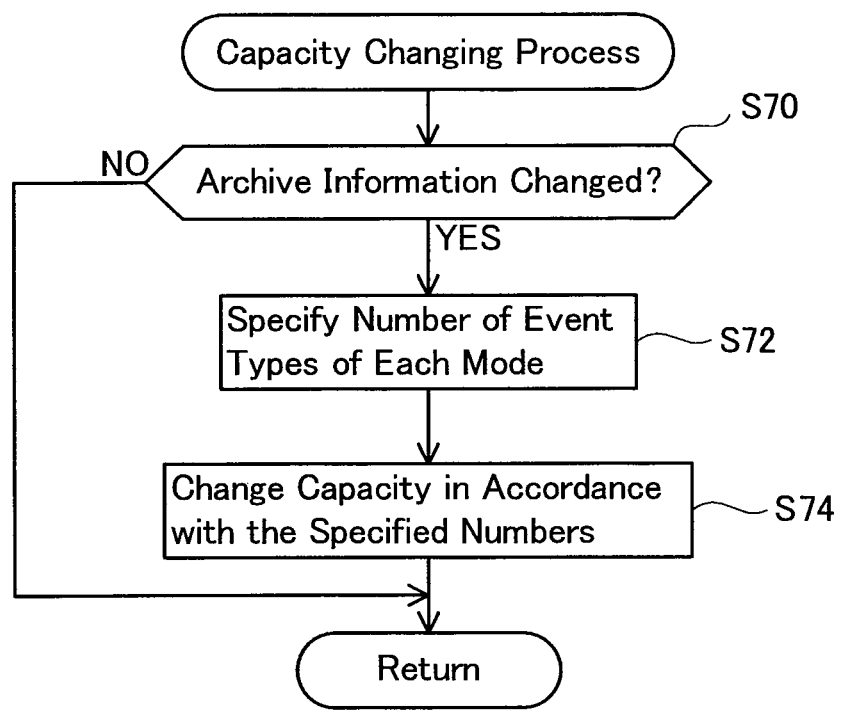
FIG. 12 shows a flow chart of a capacity changing process executed by the multi-function device (second embodiment).

FIG. 12 shows a flow chart of the capacity changing process of the present embodiment. The user can change the stored contents of the archive information 60 (see FIG. 2) by operating the operation part 36 (see FIG. 1). For example, the user can change the service mode mapped to 'Recording paper jam' from 'O' to 'X'. The control part 32 monitors whether the archive information 60 has been changed by the user (S70). In the case where S70 is YES, the process proceeds to S72. In the case where S70 is NO, S72 and S74 are skipped and the process returns to S70. In S72, the control part 32 specifies the number of event types mapped to each mode. That is, the control part 32 specifies the number of 'O' in the service mode and the number of 'O' in the user mode based on the stored contents in the archive information 60 after the change has been made. Here, the number of 'O' present in the service mode will be SN, and the number of 'O' present in the user mode will be UN.

Next, the control part 32 changes the capacity of the service mode storage area 90 and the user mode storage area 92 based on the SN and UN specified in S72 (S74). In the present embodiment, the sum of the capacity of the service mode storage area 90 and of the user mode storage area 92 will be DT bytes. In this case, the control part 32 sets the capacity of the service mode storage area 90 at DT×SN/(SN+UN) bytes, and sets the capacity of the user mode storage area 92 at DT×UN/(SN+UN) bytes. The capacity of the storage areas 90 and 92 is thus changed to be in proportion with the number of event types mapped to each mode.

In the case where SN is greater than UN, the events which the serviceman must be notified of are estimated to be occurring at a greater frequency than the events which the user must be notified of. In the present embodiment, the capacity of the storage areas 90 and 92 can be changed in accordance with this difference in frequency.

Variant 1 of the Second Embodiment

In the process of S72 of the second embodiment, the number of event types mapped with the modes is specified. That is, the number of 'O' in the service mode and the number of 'O' in the user mode is specified. However, in the process of S72, the control part 32 may equally well specify the number of event types that are not mapped to each mode. That is, the number of 'X' in the service mode and the number of 'X' in the user mode may be specified. For example, the number of 'X' present in the service mode will be SM, and the number of 'X' present in the user mode will be UM. In this case, in the process of S74, the control part 32 sets the capacity of the service mode storage area 90 at DT×UM/(SM+UM) bytes, and sets the capacity of the user mode storage area 92 at DT×SM/(SM+UM) bytes. In this case, also, the capacity of the storage areas 90 and 92 is changed to be in proportion with the number of event types mapped to each mode.

Variant 2 of the Second Embodiment

In the second embodiment, the capacity of the storage areas 90 and 92 is changed when the stored contents of the archive information 60 is changed. However, the stored contents of the archive information 60 may equally well be fixed. That is, the number of event types mapped to the modes may be fixed. The storage area (90 or 92) for the mode mapped to a large number of event types may have a large capacity, and the storage area (92 or 90) for the mode mapped to a small number of event types may have a small capacity. The capacity of the storage areas 90 and 92 may thus be fixed unchangeably.

Third Embodiment

In the present embodiment the capacity of the storage areas 90 and 92 is changed utilizing a technique differing from that in the second embodiment. This storage capacity changing process is performed by the control part 32 (see FIG. 1).

Capacity Changing Process

Third Embodiment

Figure 13:
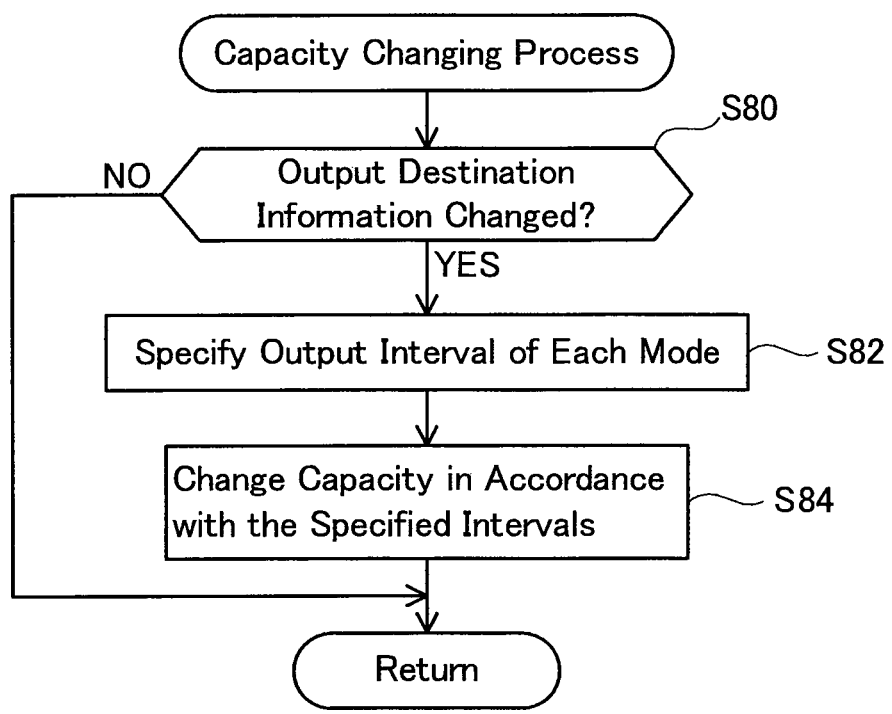
FIG. 13 shows a flow chart of a capacity changing process executed by the multi-function device (third embodiment).

FIG. 13 shows a flow chart of the capacity changing process of the present embodiment. The user can change the stored contents of the destination information 70 (see FIG. 3) by operating the operation part 36 (see FIG. 1). For example, the user can change the mail transmission time 80, the FAX transmission time 84, the list output time 86, etc. The control part 32 monitors (S80) whether the destination information 70 has been changed by the user. In the case where S80 is YES, the process proceeds to S82. In the case where S80 is NO, S82 and S84 are skipped and the process returns to S80. In S82, the control part 32 specifies the output interval mapped to each mode. First, the control part 32 specifies the smallest output interval of the three times mapped to the service mode (the mail transmission time, the FAX transmission time, and the list output time). In the case of the example of FIG. 3, the mail transmission time 80 '8 hours' is specified. Further, the control part 32 specifies the smallest output interval of the three times mapped to the user mode (the mail transmission time, the FAX transmission time, and the list output time). In the case of the example of FIG. 3, '24 hours' of the mail transmission time (daily at 8 a.m.) is specified.

Next, the control part 32 changes the capacity of the service mode storage area 90 and the user mode storage area 92 (S84) in accordance with the output intervals specified in S82. In the case where the sum of the capacity of the service mode storage area 90 and of the user mode storage area 92 is DT bytes, the control part 32 sets the capacity of the service mode storage area 90 at DT×8/(8+24) bytes, and sets the capacity of the user mode storage area 92 at DT×24/(8+24) bytes. The capacity of the storage areas 90 and 92 is thus changed to be in proportion with the output intervals mapped to each mode.

In the present embodiment, the output interval of the mail transmission time of the user mode (24 hours) is greater than the output interval of the mail transmission time 80 of the service mode (8 hours). As a result, it is preferred that the capacity of the user mode storage area 92 is greater than that of the service mode storage area 90. This is because it is estimated that a greater number of events will occur during the interval when the output interval is large. In the present embodiment, the capacity of the storage areas 90 and 92 can be changed in accordance with the difference in output interval.

Variant of the Third Embodiment

In the third embodiment, the capacity of the storage areas 90 and 92 is changed when the stored contents of the destination information 70 is changed. However, the stored contents of the destination information 70 may equally well be fixed. That is, the output intervals mapped to the modes may be fixed. The storage area (90 or 92) for the mode mapped to a large output interval may have a large capacity, and the storage area (92 or 90) for the mode mapped to a small output interval may have a small capacity. The capacity of the storage areas 90 and 92 may thus be fixed unchangeably.

Fourth Embodiment

In the present embodiment the capacity of the storage areas 90 and 92 is changed utilizing a technique differing from those in the second and third embodiments. This capacity changing process is performed by the control part 32 (see FIG. 1).

Capacity Changing Process

Fourth Embodiment

Figure 14:
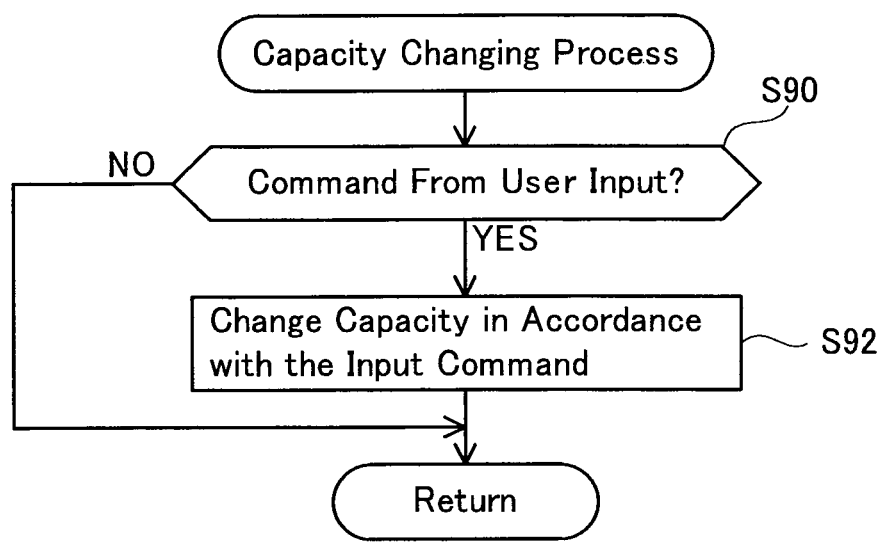
FIG. 14 shows a flow chart of a capacity changing process executed by the multi-function device (fourth embodiment).

FIG. 14 shows a flow chart of the capacity changing process of the present embodiment. The user can input the capacity of the service mode storage area 90 and of the user mode storage area 92 by operating the operation part 36 (see FIG. 1). For example, in the case where the sum of the capacity of the service mode storage area 90 and of the user mode storage area 92 is DT bytes, it is possible to input a capacity of the storage areas 90 and 92 that is within a range in which the sum of the capacity of the storage areas 90 and 92 does not exceed DT bytes. The control part 32 monitors whether the capacity of the storage areas 90 and 92 has been input by the user (S90). In the case where S90 is YES, the process proceeds to S92. In the case where S90 is NO, S92 is skipped and the process returns to S90. In S92, the control part 32 changes the capacity of the service mode storage area 90 and the user mode storage area 92 to the capacity that was input in S90 (S92). The capacity of the storage areas 90 and 92 is thus set to a capacity in accordance with the command of the user.

In the present embodiment, the capacity of the storage areas 90 and 92 can be changed in accordance with the intention of the user. Furthermore, the technical elements described in the embodiments 2 to 4 may be utilized independently or in two or more combinations.

Fifth Embodiment

In the first embodiment, the multi-function device stores and outputs the event occurrence information. In the present embodiment, a personal computer (hereafter termed 'PC') connected with a multi-function device stores and outputs the event occurrence information of the events that occurred in the multi-function device.

(Configuration of the System)

Figure 15:
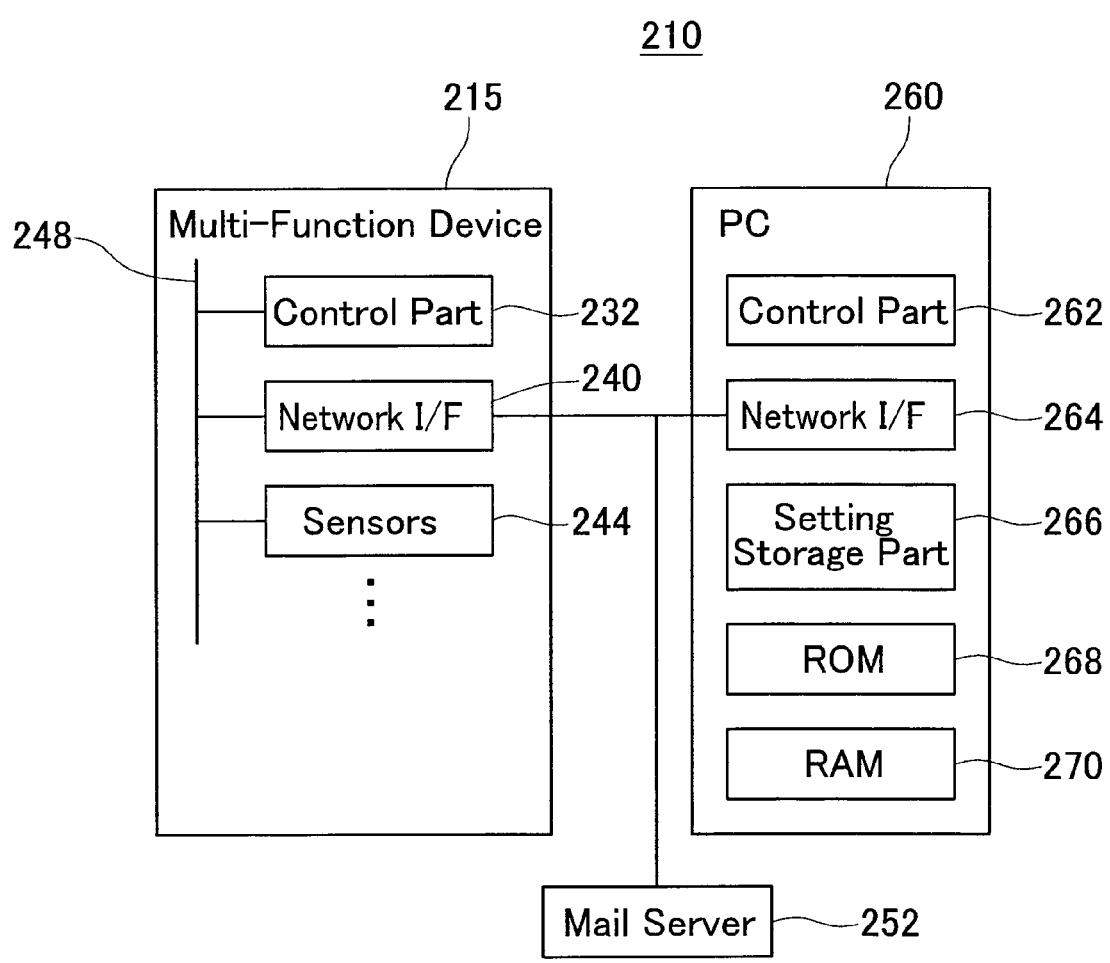
FIG. 15 shows a schematic view of the multi-function device system (fifth embodiment).

FIG. 15 shows a configuration of a multi-function device system 210 of the present embodiment. The multi-function device system 210 includes a multi-function device 215, a PC 260, etc. The multi-function device 215 has a control part 232, a network I/F 242, various types of sensors 244, etc. Although this is not shown in FIG. 15, the multi-function device 215 also has the remaining devices 20, 22, 26, 28, etc. shown in FIG. 1. The control part 232 exerts general control over the operation of the multi-function device 215. The network I/F 242 is connected with the PC 260. The sensors 244 are identical with the sensors 44 (see FIG. 1) of the first embodiment.

The PC 260 comprises a control part 262, a network I/F 264, a setting storage part 266, a ROM 268, a RAM 270, etc. The control part 262 exerts general control over the operation of the PC 260. The network I/F 264 is connected with the multi-function device 215 and a mail server 252. The setting storage part 266 has the same stored contents as the setting storage part 24 of the first embodiment. That is, the setting storage part 266 stores the archive information 60 (see FIG. 2) and the destination information 70 (see FIG. 3). The ROM 268 stores various programs executed by the control part 262. The RAM 270 comprises the service mode storage area 90 and the user mode storage area 92 that are the same as those included in the RAM 38 of the first embodiment.

(Contents of the Process of the Multi-Function Device)

The control part 232 of the multi-function device 215 outputs information specifying event type each time an event has occurred in itself (below, this will be termed 'event type specifying information') to the PC 260. The PC 260 can thus recognize the types of events that have occurred in the multi-function device 215. Further, the multi-function device 215 is capable of executing a printing process and a FAX transmission process in accordance with commands from the PC 260. This point will be described again later.

(Contents of the Process of the PC)

The control part 262 of the PC 260 inputs the event type specifying information output from the multi-function device 215, and stores the event occurrence information 100 in the service mode storage area and/or the user mode storage area of the RAM 270 in accordance with the flow charts of FIGS. 5 and 6. Further, the control part 262 executes a process that is identical with the output monitoring process of FIG. 9. However, the contents of the output processes of S34 and S40 of FIG. 9 differ somewhat. The contents of the output processes executed by the control part 262 will be described below.

(Contents of the Output Processes of the PC)

Figure 16:
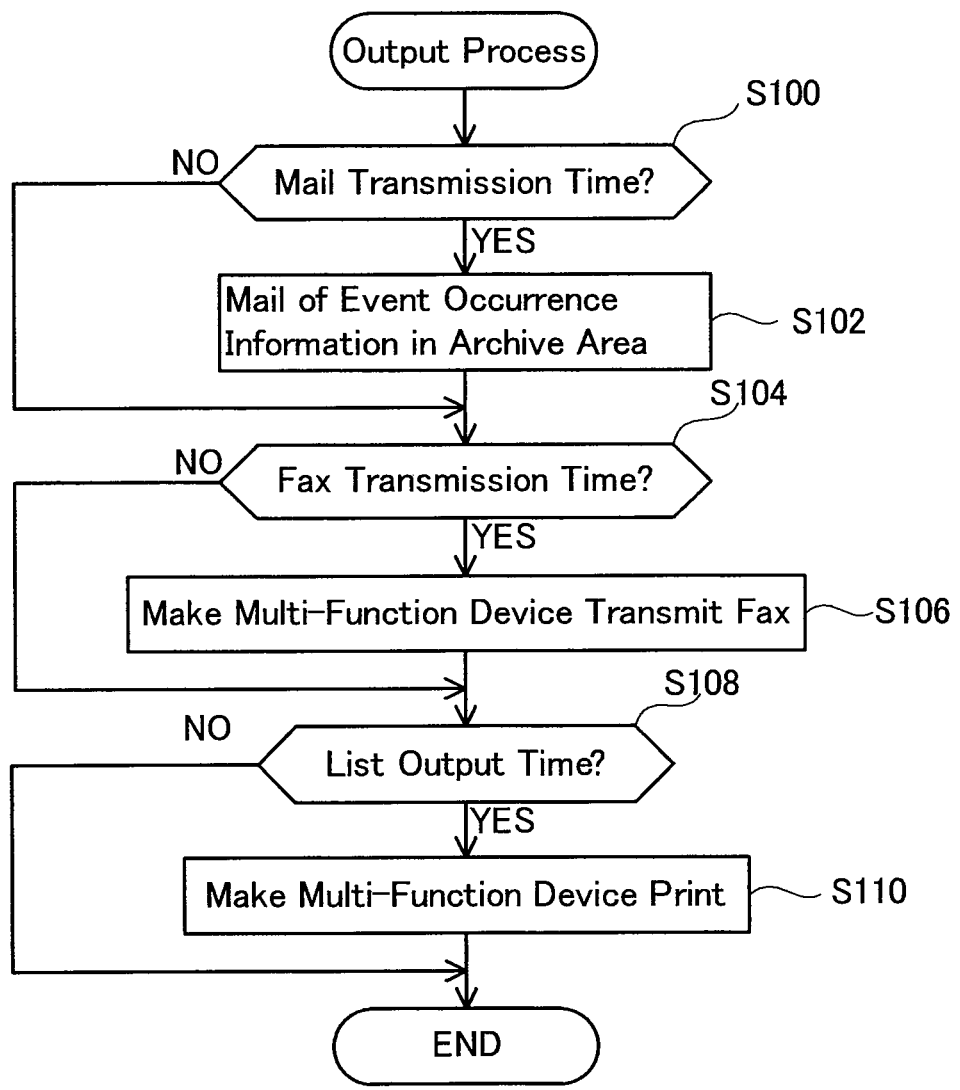
FIG. 16 shows a flow chart of output processes executed by a PC.

FIG. 16 shows a flow chart of the output processes executed by the control part 262 of the PC 260. First, the control part 262 specifies the mail transmission time from the setting storage part 266, and compares the specified mail transmission time with the current time (S100). This process is identical with the process of S50 in FIG. 10. In the case where S100 is YES, the process proceeds to S102. In the case where S100 is NO, S102 is skipped and the process proceeds to S104. In S102, the control part 262 transmits the event occurrence information 100 being stored in the archive area as mail. This process is identical with the process of S52 in FIG. 10.

In S104, the control part 262 specifies the FAX transmission time from the setting storage part 266. This process is identical with the process of S54 in FIG. 10. In the case where S104 is YES, the process proceeds to S106. In the case where S104 is NO, S106 is skipped and the process proceeds to S108. In S106, the control part 262 transmits the event occurrence information 100 being stored in the archive area as a FAX from the multi-function device 215. That is, the control part 262 transmits the following to the multi-function device 215: all of the event occurrence information 100 being stored in the archive area (the service mode storage area or the user mode storage area), and the FAX number corresponding to the archive area (the FAX number of the serviceman or the user). FAX transmission of the event occurrence information 100 from the multi-function device 215 is thus performed.

In S108, the control part 262 specifies the list output time from the setting storage part 266. This process is identical with the process of S58 in FIG. 10. In the case where S108 is YES, the process proceeds to S110. In the case where S108 is NO, S110 is skipped and the output process ends. In S110, the control part 262 executes a printing process, in the multi-function device 215, of the event occurrence information 100 being stored in the archive area. That is, the control part 262 sends all of the event occurrence information 100 being stored in the archive area (the service mode storage area or the user mode storage area) to the multi-function device 215. The printing of the event occurrence information 100 in the multi-function device 215 is thus performed.

In the present embodiment, also, the stored contents of the service mode storage area of the RAM 270 are not affected by the event occurrence information 100 that the user should be informed of. Further, the stored contents of the user mode storage area of the RAM 270 are not affected by the event occurrence information 100 that the serviceman should be informed of. With the PC 260 of the present embodiment, the event occurrence information 100 can be provided to both the serviceman and the user without being affected by the amount of information that should be output to another destination.

Some techniques set forth in the above embodiments will be given.

(1) An information processing device may be housed within a multi-function device.

(2) An information processing device may store archive information for each of a plurality of modes (for example, service mode and user mode). The archive information may be a combination of the mode and an event type. Further, an information processing device may store destination information for each of a plurality of modes (for example, service mode and user mode). The destination information may be a combination of the mode and a destination. The event type and destination can be said to be combined (mapped) when the archive information and the destination information are combined.

(3) The event occurrence information may include data showing event type and data showing the time that the event occurred.

(4) Each individual storage area may be capable of storing a plurality of items of event occurrence information. In the case where a new item of event occurrence information is to be stored in an individual storage area in which the number of items of event occurrence information being stored is already at its upper limit, the oldest item of event occurrence information that is being stored in the individual storage area may be erased.

Specific examples are described above in detail, but these examples are merely illustrative and place no limitation on the technique disclosed in the present specification. The technology described in the present specification also encompasses various changes and modifications based on the specific examples described above. In the embodiments described above, the events occurring in the multi-function devices 15 and 215 are monitored. However, the technique of the above embodiments can also be made suitable for events occurring in other devices (printers, facsimiles, PCs, etc.). Furthermore, the technical elements explained in the present specification and drawings provide technical value and utility either independently or through various combinations.

What is claimed is:

1. An information processing device for storing and outputting information concerning events, the information processing device comprising:
    a destination-event type storing device that stores a combination of a first destination and a first event type, stores a combination of the first destination and a second event type, stores a combination of a second destination and the second event type, and stores a combination of the second destination and a third event type;
    an individual storing device comprising a first individual storing area corresponding to the first destination and a second individual storing area corresponding to the second destination;
    a storage control device that stores first event occurrence information indicating that the first event type has occurred in the first individual storage area, stores second event occurrence information indicating that the second event type has occurred in the first individual storage area, stores the second event occurrence information in the second individual storage area, and stores third event occurrence information indicating that the third event type has occurred in the second individual storage area; and
    an output control device that outputs the first event occurrence information and the second event occurrence information stored in the first individual storage area to the first destination, and outputs the second event occurrence information and the third event occurrence information stored in the second individual storage area to the second destination.

2. The information processing device as in claim 1, wherein the first destination includes one of a first mail address, a first facsimile number, and a combination thereof, and wherein the second destination includes one of a second mail address, a second facsimile number, and a combination thereof.

3. The information processing device as in claim 1, wherein
the destination-event type storing device, for each destination, stores a combination of a destination and an output interval, and
the output control device, for each individual storage area, outputs the event occurrence information stored in the individual storage area to the destination corresponding to the individual storage area at the output interval combined with the destination.

4. The information processing device as in claim 3, wherein the capacity of each individual storage area is determined such that the larger the output interval combined with the destination corresponding to the individual storage area, the greater the capacity of the individual storage area.

5. The information processing device as in claim 4, further comprising:
a capacity changing device that, in a case where the stored contents of the destination-event type storing device have changed, specifies the output interval combined with each destination based on the stored contents after this change has occurred, and changes the capacity of each individual storage area in accordance with the specified output intervals.

6. The information processing device as in claim 1, wherein the capacity of each individual storage area is determined such that the larger the number of event types combined with the destination corresponding to the individual storage area, the greater the capacity of the individual storage area.

7. The information processing device as in claim 6, further comprising:
a capacity changing device that, in a case where the stored contents of the destination-event type storing device have changed, specifies the number of event types combined with each destination based on the stored contents after this change has occurred, and changes the capacity of each individual storage area in accordance with the specified numbers.

8. The information processing device as in claim 1, further comprising:
an input device configured to receive a command from a user;
and a capacity changing device that changes the capacity of each individual storage area in accordance with the command input to the input device.

9. An information processing device for storing and outputting information concerning events, the information processing device comprising:
an output format-event type storing device that, for each of a plurality of output formats, stores a combination of an output format and an event type;
an individual storing device comprising a plurality of individual storing areas, each individual storing area corresponding to a different output format, the plurality of individual storing areas including a first individual storing area corresponding to a first output format and a second individual storing area corresponding to a second output format;
a storage control device that, for each event that occurs, specifies the output format combined with the event type from the output format-event type storing device, and wherein if the specified output format is the first output format, the storage control device stores first event occurrence information indicating that the event type has occurred in the first individual storage area and if the specified output format is the second output format, the storage control device stores second event occurrence information indicating that the event type has occurred in the second individual storage area; and
an output control device that outputs the first event occurrence information stored in the first individual storage area by using the first output format, and outputs the second event occurrence information stored in the second individual storage area by using the second output format.

10. The information processing device as in claim 9, wherein the plurality of output formats include an external output format in which the event occurrence information is output to the exterior, and a printing output format in which the event occurrence information is printed.

11. The information processing device as in claim 9, wherein
the output format-event type storing device stores a combination of the first output format and a first event type, stores a combination of the first output format and a second event type, stores a combination of the second output format and the second event type, and stores a combination of the second output format and a third event type,
the storage control device stores the-first event occurrence information indicating that the first event type has occurred in the first individual storage area, stores the second event occurrence information indicating that the second event type has occurred in the first individual storage area, stores the second event occurrence information in the second individual storage area, and stores third event occurrence information indicating that the third event type has occurred in the second individual storage area, and
the output control device outputs the first event occurrence information and the second event occurrence information stored in the first individual storage area by using the first output format, and outputs the second event occurrence information and the third event occurrence information stored in the second individual storage area by using the second output format.

12. An information processing device for storing and outputting information concerning events, the information processing device comprising:
a mode information storing device that, for each of a plurality of modes, stores mode-event type information including a combination of a mode and an event type, and mode-destination information including a combination of a mode and a plurality of destinations;
an individual storing device comprising a plurality of individual storing areas, each individual storing area corresponding to a different mode, the plurality of individual storing areas including a first individual storing area corresponding to a first mode and a second individual storing area corresponding to a second mode;
a storage control device that, for each event that occurs, specifies the mode combined with the event type in the mode-event type information, and wherein if the specified mode is the first mode, the storage control device stores first event occurrence information indicating that the event type has occurred in the first individual storage area, and if the specified mode is the second mode, the storage control device stores second event occurrence information indicating that the event type has occurred in the second individual storage area; and
an output control device that outputs the first event occurrence information stored in the first individual storage area to the plurality of destinations combined with the first mode in the mode-destination information, and outputs the second event occurrence information stored in the second individual storage area to the plurality of destinations combined with the second mode in the mode-destination information.

13. The information processing device as in claim 12, wherein the mode information storing device stores the mode-event type information including a combination of the first mode and a first event type, a combination of the first mode and a second event type, a combination of the second mode and the second event type, and a combination of the second mode and a third event type, the mode information storing device stores the mode-destination information including a combination of the first mode and a plurality of first destinations, and a combination of the second mode and a plurality of second destinations, the storage control device stores the first event occurrence information indicating that the first event type has occurred in the first individual storage area, stores the second event occurrence information indicating that the second event type has occurred in the first individual storage area, stores the second event occurrence information in the second individual storage area, and stores third event occurrence information indicating that the third event type has occurred in the second individual storage area, and the output control device outputs the first event occurrence information and the second event occurrence information stored in the first individual storage area to the plurality of first destinations, and outputs the second event occurrence information and the third event occurrence information stored in the second individual storage area to the plurality of second destinations.

14. An information processing device for storing and outputting information concerning events, the information processing device comprising:

a mode information storing device that, for each of a plurality of modes, stores mode-event type information including a combination of a mode and an event type, and mode-output format information including a combination of a mode and a plurality of output formats;

an individual storing device comprising a plurality of individual storing areas, each individual storing area corresponding to a different mode, the plurality of individual storing areas including a first individual storing area corresponding to a first mode and a second individual storing area corresponding to a second mode;

a storage control device that, for each event that occurs, specifies the mode combined with the event type in the mode-event type information, and wherein if the specified mode is the first mode, the storage control device stores first event occurrence information indicating that the event type has occurred in the first individual storage area, and if the specified mode is the second mode, the storage control device stores second event occurrence information indicating that the event type has occurred in the second individual storage area; and an output control device that outputs the first event occurrence information stored in the first individual storage area by using the plurality of output formats combined with the first mode in the mode-output format information, and outputs the second event occurrence information stored in the second individual storage area by using the plurality of output formats combined with the second mode in the mode-output format information.

15. The information processing device as in claim 14, wherein the mode information storing device stores the mode-event type information including a combination of the first mode and a first event type, a combination of the first mode and a second event type, a combination of the second mode and the second event type, and a combination of the second mode and a third event type, the mode information storing device stores the mode-output format information including a combination of the first mode and a plurality of first output formats, and a combination of the second mode and a plurality of second output formats, the storage control device stores the first event occurrence information indicating that the first event type has occurred in the first individual storage area, stores the second event occurrence information indicating that the second event type has occurred in the first individual storage area, stores the second event occurrence information in the second individual storage area, and stores third event occurrence information indicating that the third event type has occurred in the second individual storage area, and the output control device outputs the first event occurrence information and the second event occurrence information stored in the first individual storage area by using the plurality of first output formats, and outputs the second event occurrence information and the third event occurrence information stored in the second individual storage area by using the plurality of second output formats.

\* \* \* \* \*